S. C. SCHOFIELD.
Grain Drill.

No. 40,365. Patented Oct. 20, 1863.

Witnesses
J. W. Coombs
G. W. Reed

Inventor:
S. C. Schofield
per Munn & Co.
attys.

UNITED STATES PATENT OFFICE.

S. C. SCHOFIELD, OF FREEPORT, ILLINOIS.

IMPROVEMENT IN GRAIN-DRILLS.

Specification forming part of Letters Patent No. 40,365, dated October 20, 1863.

*To all whom it may concern:*

Be it known that I, SILAS C. SCHOFIELD, of Freeport, in the county of Stephenson and State of Illinois, have invented a new and Improved Seeding-Machine; and I do hereby declare that the following is a full, clear, and exact description of the same, reference being had to the accompanying drawings, making a part of this specification, in which—

Figure 1:
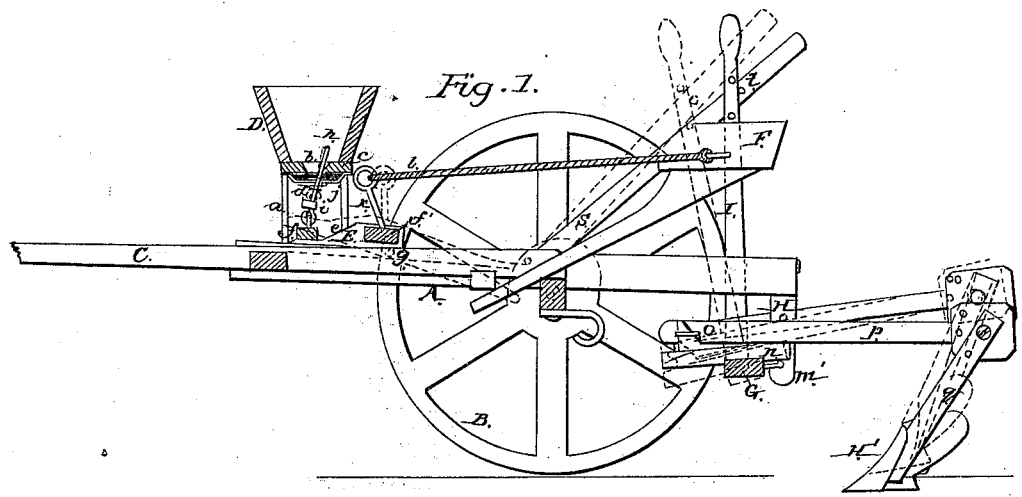
Figure 2:
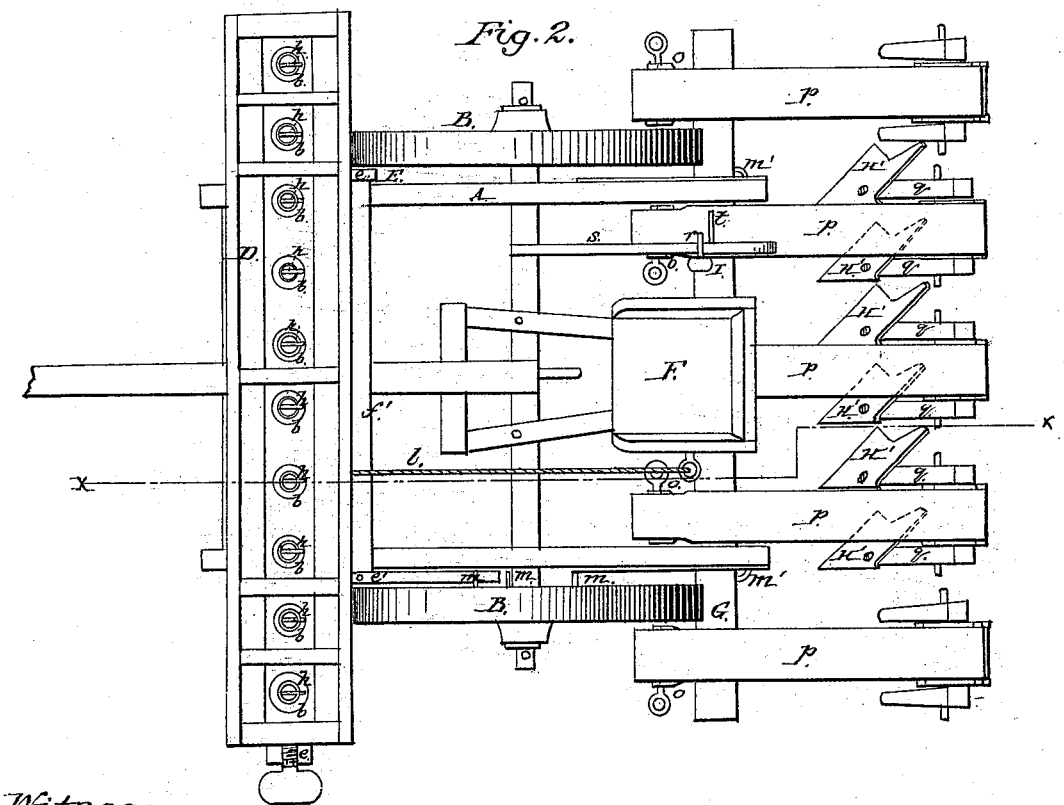

Figure 1 is a side sectional view of my invention; Fig. 2, a plan or top view of the same.

Similar letters of reference indicate corresponding parts in the two figures.

This invention relates, first, to an improvement in the seed-distributing apparatus, whereby the seed is discharged in a uniform manner and in greater or less quantity on a given area, as may be required, and the distribution of the seed stopped instantly at any time at the will of the driver or operator.

The invention relates, second, to an improvement in the arrangement of the plows or coverers, whereby the same may be adjusted or arranged at any angle, as may be required, to obtain a proper depth of penetration, and also entirely elevated above the surface of the ground when required to be inoperative.

To enable those skilled in the art to fully understand and construct my invention, I will proceed to describe it.

A represents a rectangular frame, which is mounted on two wheels, B B, with a draft-pole, C, attached centrally to it, and D is a seed-box or hopper, which is secured to the front part of the frame by uprights $a$, which elevate the bottom of the seed-box a short distance above the frame A, as shown clearly in Fig. 1. The bottom of the seed-box D is perforated with holes $b$, and to the bottom of the box there is permanently attached a perforated plate, $c$, underneath which there is an adjustable or sliding perforated plate, $d$. The latter may be adjusted by means of a screw, $e$, as shown in Fig. 2, and the capacity of the holes in the bottom of the seed-box varied as desired. The permanent plate $c$ is merely to prevent wear, which would occur if the plate $d$ were allowed to be moved in contact with the wooden bottom of the seed-box D. This arrangement for varying the capacity of the holes in the bottom of the seed-box is quite old, and therefore does not require a minute description.

E represents a frame, which is composed of the end bars, $e\ e'$, connected by two parallel cross-bars, $f\ f'$. The bars $e\ e'$ work on pivots $g\ g$, and the front cross-bar, $f$, has a series of wire rods, $h$, attached to it by joints $i$, formed by hooks and staples, as shown clearly in Fig. 1. These wire rods have each a piece of leather, $j$, or other similar substance fitted on them, and these pieces of leather are rather greater in area than the perforations or openings $b$ in the bottom of the seed-box and the perforations in the plate $d$. To the back cross-bar, $f'$, there is attached an upright, $k$, the upper end of which has a cord, $l$, connected to it. The end bar $e'$ of the frame E extends back considerably farther than the bar $e$, so that it may be acted upon by pins $m$, attached to the inner side of one of the wheels B. By this means an up-and-down movement is given to the rods $h$, and the perforations through which the seed is discharged effectually prevented from choking or clogging up and the even distribution of the seed fully insured. At any time when it is desired to stop the distribution of the seed the driver from his seat F draws back the rope or cord $l$, and thereby throws up the bar $f$ and causes the leathers $j$ to cover or stop the perforations in the bottom of the seed-box, as shown in red in Fig. 1. Thus it will be seen that the seed-distributing apparatus is under the complete control of the driver.

G represents a bar, which is connected by links $m'$ to pendent plates H at the back end of the frame A. This bar G has a series of short bars, $n$, attached to it at right angles and parallel with each other, and to the front end of each bar $n$ there is attached by a hinge or joint, $o$, a bar, $p$. These bars $p$ project a considerable distance back of the bar G, and they have inclined standards $q$ attached to them, the standards having teeth or plows H′ at their lower ends. The bar G has a lever, I, attached to it, which extends up by the side of the seat F of the driver, and has a guide, $r$, attached to it, through which a bar, $s$, passes, said bar having a pin, $t$, passing transversely through it to retain the lever I at any desired point within the scope of its adjustment. It will be seen that by adjusting the bar G the bars $p$ may be placed at a greater or less angle, and the obliquity of the plows or teeth H′ relatively with the ground varied as desired, and this variation in the obliquity or angle of the plows regulates the depth of their penetration; and it will also be seen that in order to avoid a too great elevation of the plows or teeth, consequent on this adjustment of the bar G, the bar G may be lowered in the pendants H. The arrangement, as a whole, is extremely simple and efficient, and is fully under the control of the operator.

Having thus described my invention, what I claim as new, and desire to secure by Letters Patent, is—

1. The employment or use of the rods $h$, attached to the vibrating frame E, and passing through the perforated plate $d$ and bottom of the seed-box D, the rods $h$ being provided with leathers $j$, and all arranged to operate as and for the purpose set forth.

2. The arrangement and combination of the bar G with the bars $n\ p$, attached to it, standards $g$, teeth or plows H', lever I, and bar $s$, all arranged, as shown, to admit of the adjustment of the teeth or plows, as set forth.

S. C. SCHOFIELD.

Witnesses:
M. S. PARTRIDGE,
G. W. REED.